UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

NAPHTHYLENE-DIAMINE DISULPHO-ACID.

SPECIFICATION forming part of Letters Patent No. 498,882, dated June 6, 1893.

Application filed December 13, 1892. Serial No. 455,069. (Specimens.) Patented in Germany August 24, 1890, No. 61,174; in England September 27, 1890, No. 15,346, and in France September 29, 1890, No. 208,526.

*To all whom it may concern:*

Be it known that I, MEINHARD HOFFMANN, a citizen of Prussia, and a resident of Mainkur, near Frankfort-on-the-Main, Germany, have invented certain new and useful Improvements in the Manufacture of Naphthylene-Diamine Disulpho-Acid, of which the following is a specification.

This invention relates to the production of a new naphthylenediaminedisulpho acid, for which patents have been obtained in Germany, No. 61,174, dated August 24, 1890, in Great Britain, No. 15,346, dated September 27, 1890, and in France, No. 208,526, dated September 29, 1890. This new acid differs from all analogous compounds by its property of being transformed by nitrous acid into a tetrazo compound which can be combined with phenols or amines. In order to prepare this acid I transform the naphthalene-beta-sulpho acid 2.6 into a dinitro compound and treat this product with reducing agents.

In carrying out this invention I proceed for instance as follows: Three hundred and twenty-six kilograms of the calcium salt of naphthalenedisulpho acid 2.6 are dissolved in two thousand kilograms of sulphuric acid (monohydrate) at a temperature of from 0 to 10° centigrade. A cold mixture of two hundred kilograms concentrated nitric acid and two hundred kilograms of monohydrate sulphuric acid is then added. After a lapse of three days this mixture is poured at a temperature of 20° to 30° centigrade into six thousand liters water saturated with common salt. After cooling the sodium salt of the dinitro acid, forming small yellow crystals, separated by filtration and washed with salt water, is suspended in four thousand liters water and reduced with iron with addition of acetic acid. When the reduction is completed the iron is precipitated by carbonate of soda and to the filtered liquor are added two hundred kilograms of hydrochloric acid. The diamidonaphthalene-beta-disulphonic acid separates immediately in the form of colorless microscopic crystals. In this expample the naphthalene-beta-disulphonate of lime can be replaced by another salt of the same acid or by mononitro-naphthaline-beta-disulphonate. It is not necessary to employ the said materials in a pure state, it is sufficient to take the crude products which result from the various technical methods used for their production. The thus obtained diamidonaphthalene-beta-disulpho acid has been found to be a derivative of the 1.5 diamidonaphthalene and therefore has the constitution:

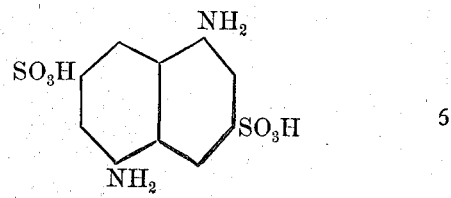

It shows the following characteristics: the free acid is almost insoluble in cold or hot water. Its sodium salt is soluble in twenty-one parts cold water and crystallizes free from water of crystallization. The potassium salt is very soluble in cold water, the barium salt is difficultly soluble in water. Submitted to the treatment of nitrous acid it forms a light yellow insoluble tetrazo compound which combines with phenols and amines, forming azo coloring matters of great technical value.

Having now described the nature of my invention and in what manner the same may be performed, what I claim as new, and desire to secure by Letters Patent, is—

1. The process of producing 1.5 naphthylenediamine 3.7 disulpho acid by treating the naphthalene-beta-disulpho acid with nitric acid and submitting the thus obtained dinitro compound to the action of reducing agents, substantially as described.

2. The new 1.5 diamidonaphthalene 3.7 disulphonic acid being almost insoluble in water, forming soluble crystallizing sodium and potassium salts, a difficultly soluble barium salt, a light yellow insoluble tetrazo compound, which combined with phenols or
5 amines forms azo coloring matters of great technical value.

In testimony that I claim the foregoing as my invention I have signed my name, in presence of two witnesses, this 21st day of November, 1892.

MEINHARD HOFFMANN.

Witnesses:
JEAN GRUND,
FRANK H. MASON.